United States Patent [19]

Poertzgen et al.

[11] Patent Number: 5,778,673

[45] Date of Patent: Jul. 14, 1998

[54] BRAKE CYLINDER MEANS FOR A MOTOR VEHICLE

[75] Inventors: Gregor Poertzgen, Koblenz, Germany; Bob Uzzell, Redditch, Great Britain

[73] Assignee: Lucas Industries public limited company, United Kingdom

[21] Appl. No.: 728,086

[22] Filed: Oct. 9, 1996

[30] Foreign Application Priority Data

Oct. 11, 1995 [DE] Germany ............... 95 307 222.0

[51] Int. Cl.⁶ ................................................. B60T 11/224
[52] U.S. Cl. ........................... 60/577; 60/582; 60/591; 92/51
[58] Field of Search ........................... 60/565, 568, 569, 60/574, 576, 577, 582, 591; 92/51

[56] References Cited

U.S. PATENT DOCUMENTS

| | | | |
|---|---|---|---|
| 1,885,552 | 11/1932 | Sawtelle | 60/577 |
| 2,295,487 | 9/1942 | Loweke | 60/577 |
| 2,442,057 | 5/1948 | Page | 60/575 |
| 2,886,950 | 5/1959 | Hause | 60/575 |

FOREIGN PATENT DOCUMENTS

| | | |
|---|---|---|
| 4322182 A1 | 1/1995 | Germany. |
| 4343386 A1 | 6/1995 | Germany. |

*Primary Examiner*—F. Daniel Lopez
*Attorney, Agent, or Firm*—Wood, Herron & Evans, L.L.P.

[57] ABSTRACT

A brake cylinder means (1) for a motor vehicle, comprises a cylinder/piston means (2) adapted to be operated by a brake pedal means for generating pressure in a hydraulic brake system of the motor vehicle, characterized in that the cylinder/piston means (2) is provided in an outer cylinder means (3) in an axially movable manner, a spring means is provided to resiliantly bias said cylinder/piston means (2) against said outer cylinder (3), in an normal actuation position said cylinder (2a) of said cylinder/piston means (2) being essentially non-movable with respect to the piston (2b) of said cylinder/piston means (2), such that the cylinder/piston means (2) being movable against the spring forces of said spring means (4) in said outer cylinder (3).

1 Claim, 4 Drawing Sheets

BRAKE CYLINDER MEANS FOR A MOTOR VEHICLE

This application claims the benefit under 35 U.S.C. §119 of European Patent Application Serial Number 95307222.0, filed Oct. 11, 1995.

The present invention relates to a brake cylinder means for a motor vehicle. More precisely, the present invention relates to a brake cylinder means for a motor vehicle comprising a cylinder/piston means adapted to be operated by a brake pedal means for generating pressure in a hydraulic brake system of the motor vehicle.

Brake cylinder means of differing designs are well known in the art. However, in so-called "brake by wire" brake systems, there are various problems with respect to suitable brake pedal means. In brake by wire systems the actuation of the brake pedal by a driver is sensed electronically by a sensor means coupled to the brake pedal. The signal derived from said sensor means is fed into an electronic control unit (ECU). In said electronic control unit the input signal is processed and an electronical output signal is provided to activate an electromechanical actuator which operates on brake pads at the wheels.

For safety reasons it is necessary to provide a path parallel to the brake by wire path described above. This parallel path is from the brake pedal means via a fluid brake cylinder to an hydraulic actuator operating the brake pads at the wheels in case the brake by wire path fails.

Such a system is called a "push-through-system". During a normal actuation, where the brake by wire path is operable, the hydraulic piston is inoperative. During an emergency actuation where the brake by wire path is inoperative, the signal from the sensor means is ignored or not present, the brake pedal is "pushing-through" the brake cylinder and feeds hydraulic fluid the brake pads at the vehicle wheels in order to decelerate the vehicle.

The problem underlying the present invention is to provide a brake cylinder means suitable for use in a "push-through-system" having little space requirements providing a safe operation.

To solve this problem, the cylinder/piston means is provided in an outer cylinder means in an axially movable manner, a spring means is provided to resiliantly bias said cylinder/piston means against said outer cylinder, in an normal actuation position said piston of said cylinder/piston means being essentially non-movable with respect to the cylinder of said cylinder/piston means, such that the cylinder/piston means being movable against the spring forces of said spring means in said outer cylinder.

Preferred embodiments of the brake pedal means according to the present invention are defined hereafter.

According to the present invention, the brake cylinder means and the outer cylinder are mounted in a essentially radial orientation with respect to each other. In other words, the cylinder of the cylinder/piston means forms a piston for the outer cylinder. This design is very advantageous, because it allows for a very compact and short set up of the brake cylinder means. Moreover, there is only a little number of components required to realize the brake cylinder means according to the invention. This has advantages with respect to the assembly of the brake cylinder means according to the invention as well as to the costs and maintenance. Further, the brake cylinder means according to the invention is a superior design with respect to crash actuations, since the axial extension of the brake cylinder of the present invention is considerably shorter than the prior art brake cylinders.

The brake cylinder means according to the present invention allows in an emergency actuation position said piston of said cylinder/piston means being axially moved by the brake pedal with respect to the cylinder of said cylinder/piston means for increasing the pressure in the hydraulic brake system of the motor vehicle.

In order to allow for an emergency actuation and a normal actuation of the brake system, the brake cylinder means according to the invention is provided or coupled to a valve means hydraulically separating said cylinder/piston means from said brake system during a normal actuation and hydraulically connecting said cylinder/piston means with said brake system during an emergency actuation.

Preferably, in the brake cylinder means the spring means mounted between the outer cylinder and the cylinder/piston means is radially surrounding the cylinder/piston means. Again, the radially oriental built-up provides for a compact configuration. In order to simulate the behaviour of conventional (non "push-through") system, the spring means has a non linear spring characteristic, preferable a progressive spring characteristic. Thus, the driver will not realize a severe difference between the behaviour of the brake cylinder means of the invention vis-a-vis a conventional brake system.

The cylinder/piston means of the invention is connected with said valve means or with said brake system by at least one flexible fluid conduit means. This allows for a very simple design and assembly of the brake system in the motor vehicle. Also, the behaviour during a car crash is improved since the number and dimensions of rigid parts are reduced. The flexible fluid conduit means prerferably being fixedly connected with said cylinder of said cylinder/piston means.

In a preferred embodiment of the brake cylinder means according to the invention, said valve means is provided at a fluid outlet of said cylinder/piston means and said flexible fluid conduit means is connected with an outlet of said valve means. This provides a very compact and rigid design.

Preferably, the cylinder/piston means is provided with a damper means for damping an axial movement of said cylinder/piston means in said outer cylinder. Thus, the similation of the conventional brake can be defined and adjusted not only by the spring means, but also by the damper means.

In one embodiment the damper means is provided by a first chamber housing fluid, said first chamber being connected via a connection with a second chamber, whereby during an axial movement of said cylinder/piston means fluid flows between said first chamber and said second chamber.

The second chamber is provided with a movable or a flexible wall, wherein the maximum expansion of said second chamber being limited by a rigid wall. This has the advantage of a well-defined end of the dumping characteristic.

If the second chamber is provided at least partly radially surrounding said first chamber it allows for a compact set-up.

When said second chamber and said chamber are connected by two or more connections being separated along the direction of movement of said cylinder/piston means in said outer cylinder means such that by an axial movement of said cylinder/piston means said at least two connections are opened or closed by said cylinder/piston means, the characteristics of the damping can be turned and defined very precisely.

At least one of said connections is provided with a throttle means for reducing the flow of fluid between said first chamber and said second chamber.

3

In a preferred embodiment of the brake cylinder means said piston of said cylinder/piston means is operatively coupled with a sensor means sensing a value or dimension like the rotational angle of the brake pedal, the path travelled by the brake pedal or by the piston, the force applied to the brake pedal, the actuation speed, the rising speed of the force applied to the brake pedal, or the acceleration of the path travelled or of the force applied, characterizing a normal actuation and supplying a sensor signal to an electronic control unit (ECU).

Preferably, said sensor means is mounted radially adjacent to said cylinder/piston means. This saves assembly space.

In a preferred embodiment of the brake cylinder means according to a fluid connection is provided from said cylinder of said cylinder/piston means to said outer cylinder in a radial direction, a connection is provided through said outer cylinder to a fluid conduit feeding said brake system, wherein said connection between said cylinder of said cylinder/piston means and said outer cylinder being formed by a ring channel being formed by an annular groove.

This allows for a rigid hydraulic fluid conduit means connecting said outer cylinder with said brake system.

Preferably, said valve means is provided at an outlet of said outer cylinder and a rigid hydraulic fluid conduit is connected to an outlet of said valve means.

The invention is also related to a spring means for a brake cylinder as described above, wherein the spring characteristics of said spring means is non linear, preferably progressive. Preferably, the spring means is a single spring element.

Further features, characteristics and advantages of the subject matter of the present invention will become apparent to a person skilled in the art when studying the following description of presently preferred embodiments referring to the enclosed drawings, wherein FIG. 1 shows a longitudinal sectional view of a brake cylinder means for a motor vehicle according to the present invention in a first embodiment.

Figure 1:
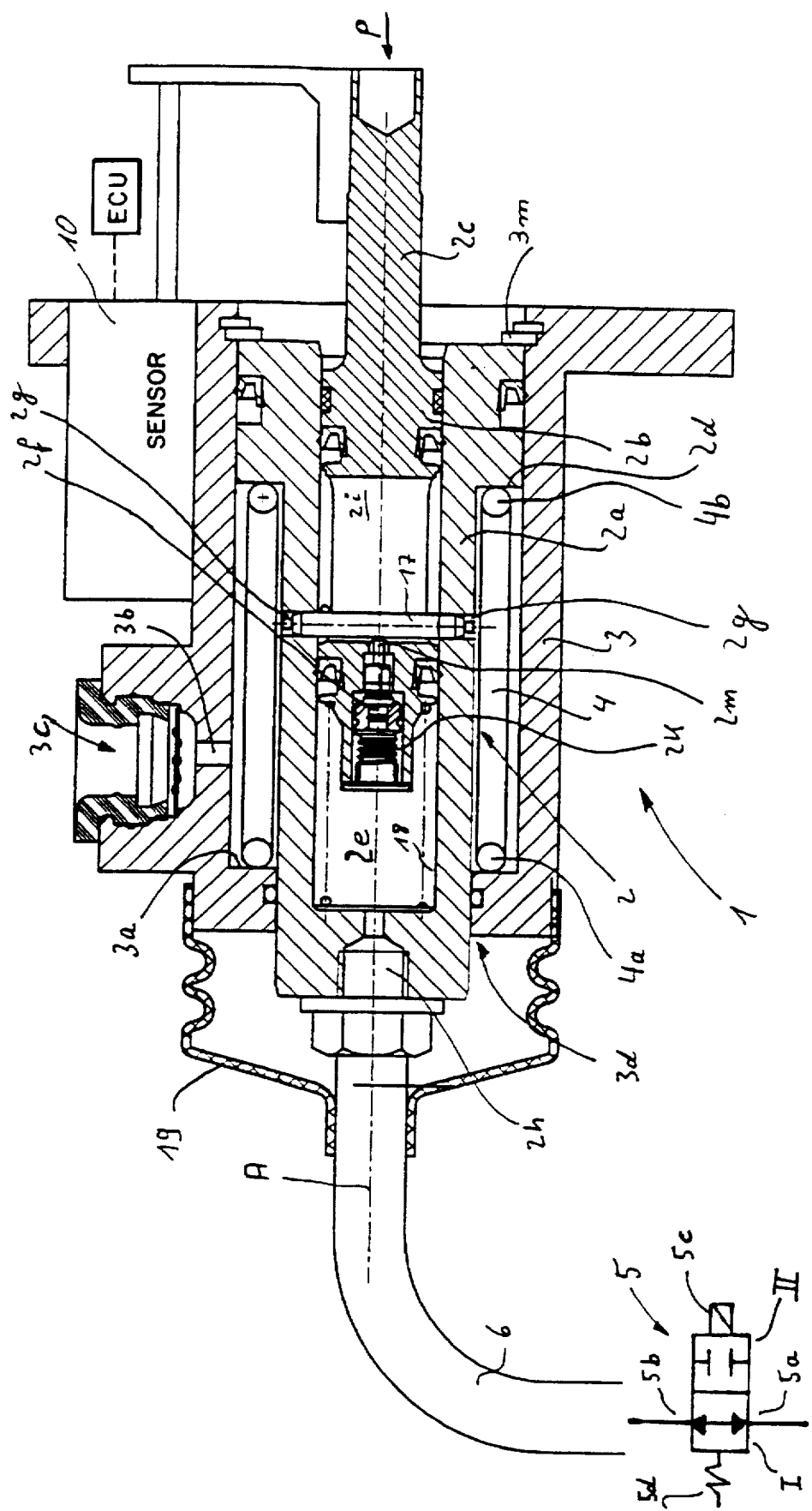

Referring to FIG. 1, a brake cylinder means 1 is provided with a cylinder/piston means 2 having a cylinder 2a and a piston 2b axially slidable therein. The piston 2b is provided at its free end with an actuation rod 2c to be coupled to a brake pedal means (not shown) for carrying out a braking operation to decelerate the motor vehicle. The cylinder/piston means 2 is mounted in an outer cylinder means 3 such that the cylinder 2b of the cylinder/piston means 2 acts as a piston means within said outer cylinder 3 in an axial direction along an axis A.

A spring means 4 having the form of a helical spring, the one end 4a thereof abutting against the bottom 3a of the outer cylinder whereas the other end 4b of the spring means 4 abuts against the shoulder 2d of the cylinder 2a of the cylinder/piston means 2. The spring means 4 has a non-linear spring characteristic in order to simulate the behaviour and appearance of a conventional brake system when a driver actuates the (not shown) brake pedal. The cylinder 2b of the cylinder/piston means 2 is provided with an ring

4 sealing at the circumference of its free end. The axial movement of the cylinder/piston means 2 within the outer cylinder 3 is limited by a locking ring 3m around the inner circumference of the outer cylinder 3. The cylinder/piston means 2 is pressed against the locking ring 3m by the spring means 4 into a (not shown) rest position.

The cylinder/piston means 2 has a hydraulic chamber 2e which is fed with hydraulic fluid through a valve 2f and a channel 2g radially connecting the interior of the cylinder 2a with the free space between the cylinder 2b of the cylinder/piston means 2 and the outer cylinder 3. This free space is connected through a further radial connection 3b to a port 3c connecting the outer cylinder 3 with a hydraulic fluid tank (not shown).

The outer cylinder 3 has an opening 3d through which the cylinder 2a of the cylinder/piston means 2 protrudes. The cylinder 2a is mounted slidably in the opening 3d of the outer cylinder 3 along the axis A. The bottom of the cylinder 2b is provided with a port 2h connecting the hydraulic chamber 2e with a flexible hydraulic conduit 6. The flexible hydraulic fluid conduit 6 leads to an electromagnetic valve means 5 hydraulically separating the cylinder/piston means 2 from the brake system during a normal actuation and hydraulically connecting the cylinder/piston means 2 with the brake system during an emergency actuation. In an alternative (not shown) embodiment, the electromagnetic valve 5 can be mounted integrally at the port 2h of the cylinder 2b such that a flexible fluid conduit being connected with an outlet 5a of the electromagnetic valve 5.

The valve means 5 is an electromagnetic valve having two positions, a first position I where an inlet port 5b of the valve means 5 is in fluid connection with the outlet port 5a and a second position II where the inlet port 5b is separated from the outlet port 5a. Upon energization of an electromagnetic means 5c the electromagnetic valve means 16 is forced into the second position II against the force of a spring means 5d. Upon de-energization of the electromagnetic valve 5, the spring means 16d forces the valve 16 into the first position I. The second position II where the chamber 2e is separated from the brake system is the normal actuation position, whereas the first position I is the emergency actuation position, where the hydraulic fluid from the chamber 2e is fed into the brake system via the valve means 5.

In the two connections 2g radially opposing each other in the cylinder 2b of the cylinder/piston means 2, a hollow pin 17 is rigidly mounted. This hollow pin 17 extends through a longitudinal slot shaped opening 2i in the piston 2c and is provided with radial (not shown) ports allowing the hydraulic fluid from the free space between the outer cylinder 3 and the cylinder 2a of the cylinder/piston means 2 to enter the inside of the cylinder 2a. A valve means of the valve 2f is forced into its closed position by a spring means 2k such that the chamber 2e is hermetically sealed unless the valve means 2f is held open by a rod 2m abutting against the pin 17 due to the spring forces of a coil spring 18 mounted in the fluid chamber 2e such as to press the piston 2c into the (shown) rest position. In this rest position, the valve means 2f is held open. Upon finiziating an actuation of the piston 2c in the direction P along the axis A, the spring means 2k forces the valve means 2f into its closed position such that the chamber 2e is sealed by the valve means 2f from the one side and other valve means 5 from the other side, if the valve means 5 is in its closed position. In this normal actuation position, actuation forces in the direction of the arrow P cause the cylinder/piston means 2 to move as a hole against the forces of the spring means 4 along the axis A. A bellow 19 protects the cylinder/piston means 2 against dust and dirt when moving through the opening 3d. To this end, the bellow 19 covers the outer circumference of the outer cylinder 3, the port 2h of the cylinder 2a and part of the hydraulic fluid conduit 6.

In the normal actuation position, the movement of the cylinder/piston means 2 within the outer cylinder 3 against the spring forces of the coil spring means 4 is sensed by a sensor means 10. This sensor means 10 is mounted radially in a parallel orientation to the axis A to sense the travel path of the piston 2c relative to the outer cylinder 3. Since in the normal actuation position, the piston 2c and the cylinder 2b of the cylinder/piston means 2 are essentially not moving relative to each other, the movement of the piston 2c is representative for the actuation of a (not shown) brake pedal introducing braking forces into the brake cylinder means 1. The spring means 4 in the free space between the outer cylinder 3 and the cylinder 2a is designed as to have a spring characteristic which is non linear and causing the same "feeling" to the driver as would a conventional brake.

If the valve means 5 is moved into its first position by the force of the spring means 5d, an actuation of the piston 2c in the direction of the arrow P along the axis A causes the rod 2m to leave the pin 17 such that the valve 2f is closed and the contents of the hydraulic chamber 2e is reduced against the forces of the spring means 18 within the chamber 2e. Consequently, the hydraulic fluid is pressed from the hydraulic chamber 2e through the port 2h into the conduit 6, through the valve 5 and leaves the valve 5 into the brake system at the valve outlet 5a.

In the subsequent FIGS. 2 to 5, identical, similar or equivalent parts are denoted with the same reference numerals as in FIG. 1.

Figure 2:
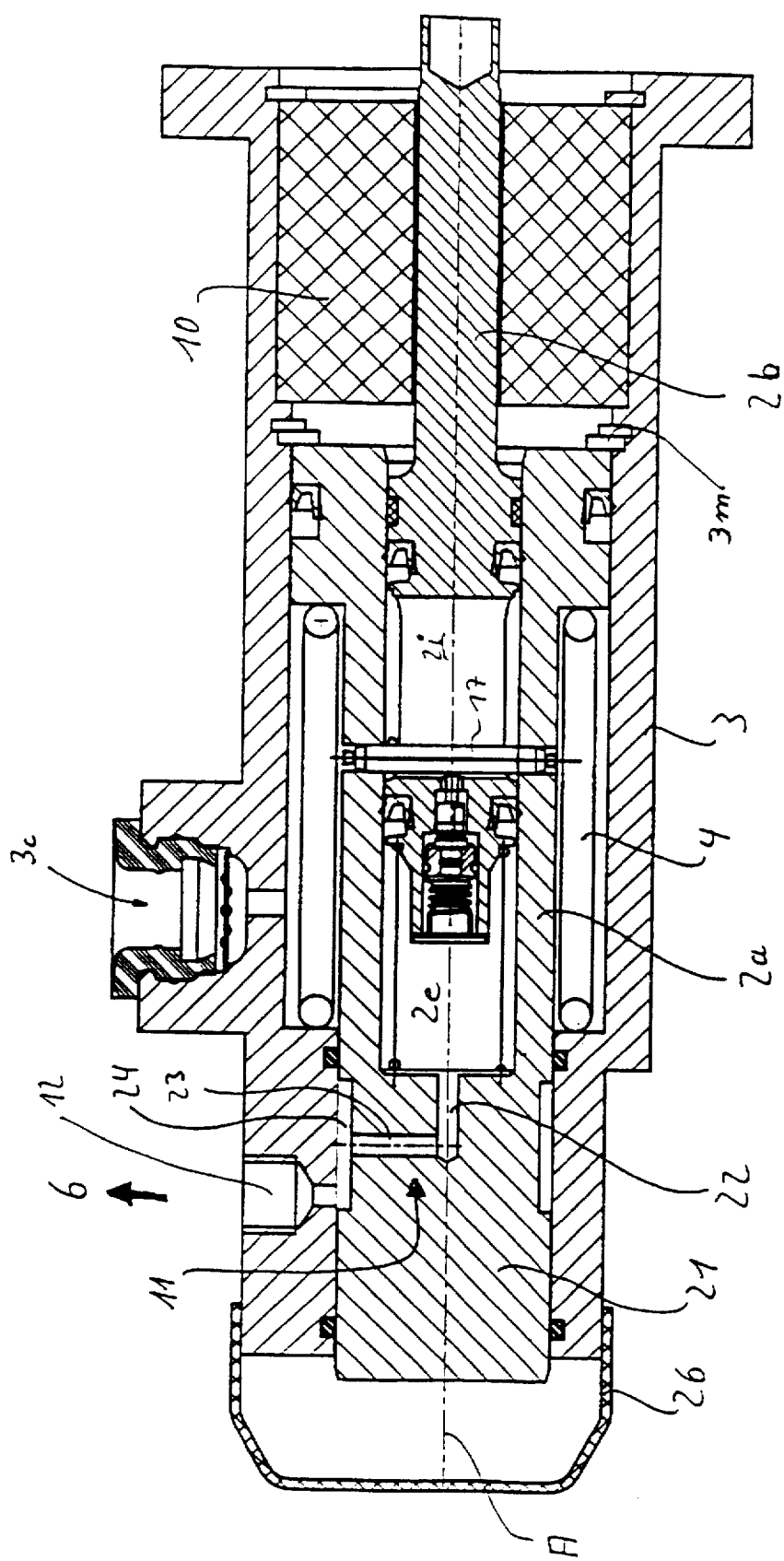
FIG. 2 shows a longitudinal sectional view of a brake cylinder means for a motor vehicle according to the present invention in a second embodiment.

The main differences between the embodiment of FIG. 1 and the embodiment of FIG. 2 is the rigid connection between the chamber 2e and the hydraulic fluid conduit 6. To achieve this, the cylinder 2a of the cylinder/piston means 2 is provided with an extension 21 at its closed end. A blind bore 22 is extending from the bottom of the hydraulic chamber 2e coaxially to the axis A. A radial conduit 23 reaches from the blind bore 22 to a ring channel 24 having the shape of an annular groove at the outer circumference of the extension 21 of the cylinder 2a. The ring channel 24 has an axial width wide enough to provide a connection 12 through the outer cylinder 3 to the fluid conduit 6 both in a (shown) rest position, where the spring means 4 in the free space in the outer cylinder 3 and the cylinder 2a is in an uncompressed state and in a (not shown) operated position, where the spring means 4 is in a compressed state. An axial movement of the extension 21 over the free end of the outer cylinder 3 is protected by a cap 26 serving a similar purpose as the bellow 19.

Figure 3:
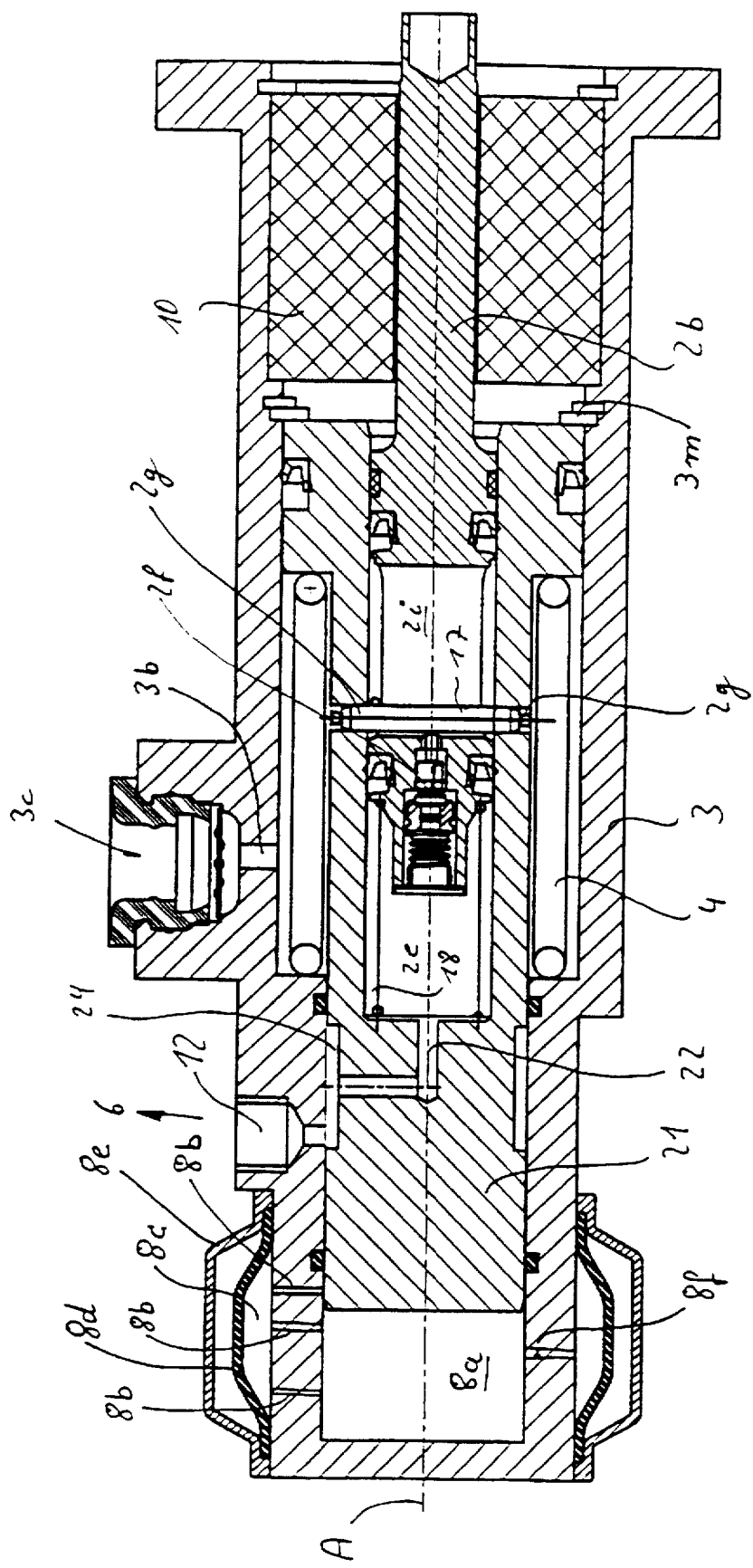
FIG. 3 shows a longitudinal sectional view of a brake cylinder means for a motor vehicle according to the present invention in a third embodiment.

In FIG. 3, a damper means 8 is provided at the free end (see FIG. 3 at the left) for damping an axial movement of the cylinder/piston means 2 in the outer cylinder 3. The damper means 8 is performed by a first chamber 8a at the free end of the outer cylinder 3. This first chamber is filled with fluid (hydraulic fluid or gas, e.g. air). The first chamber 8a is connected via various radial connections 8b extending radially through the wall of the outer cylinder 3 to a second chamber 8c. During an axial movement of the cylinder/piston means 2 along the axis A, fluid flows between the first chamber 8a and the second chamber 8c through the connections 8b. The volume of the second chamber 8c is changeable due to the fact that the second chamber 8c is provided with a movable, or flexible, wall 8d. The maximum expandability of the second chamber 8c is limited by a rigid wall 8d surrounding the flexible wall 8d. The connections 8b are separated along the direction of movement of the cylinder/piston means in the wall of the outer cylinder 3 such that by an axial movement of the cylinder/piston means 2 the connections 8b are opened or closed by the extension 21 of the cylinder/piston means 2. The connections 8b can be provided with a throttle means 8f for reducing the flow of fluid between the first chamber 8a and the second chamber 8c.

The distribution of the connections 8b along the axis of movement and the provision of the throttle means 8f can be utilized to very finely define and adjust the damping behaviour of the damping means 8. Thereby, the behaviour of the brake for a driver actuating the brake cylinder means in a normal actuation situation can be made as precisely as possible (together with the design of the spring means 4 in the free space between the outer cylinder 3 and the cylinder/piston means 2) to feel like a conventional brake system having a pneumatic/hydraulic brake booster.

Figure 4:
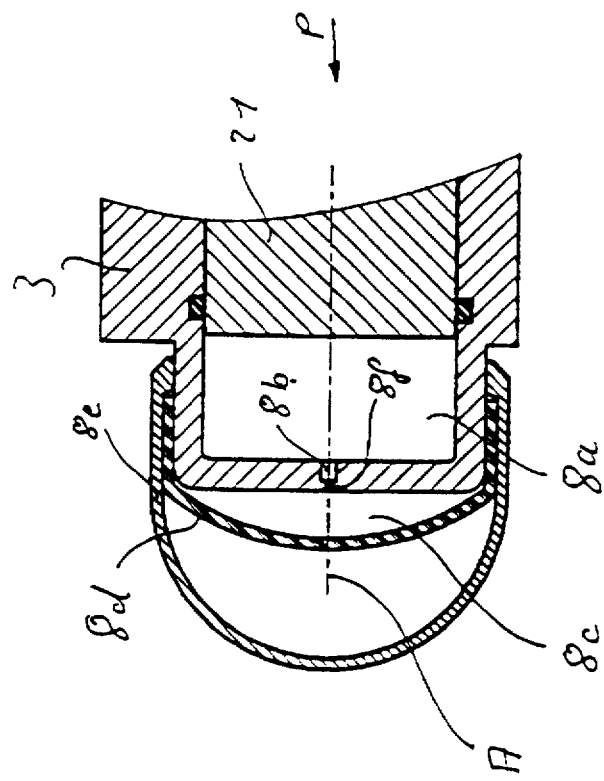
FIG. 4 shows an alternative of the damper means shown in FIG. 3.
Figure 5:
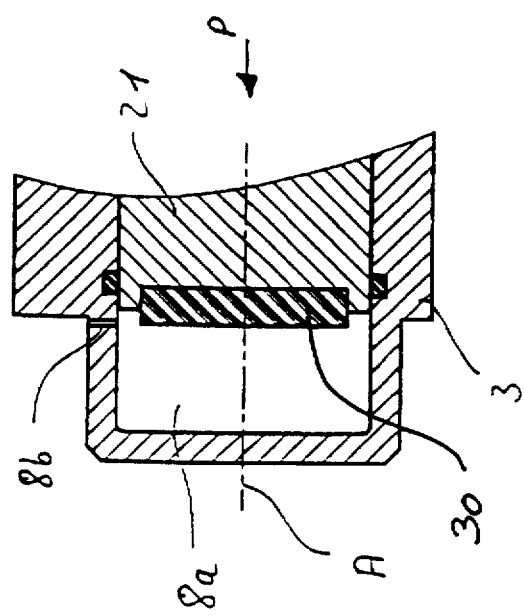
FIG. 5 shows a further alternative embodiment of the damper means shown in FIG. 3.

FIGS. 4 and 5 show further embodiments of damper means 8. In FIG. 4 the two chambers 8a, 8c are both provided in axial orientation along the axis A. This embodiment does not allow for a axial distribution of the connections 8b to finely adjust the damping behaviour.

FIG. 5 shows an embodiment of the damper means 8 where the connection 8b connects the chamber 8a with atmosphere. As soon as the cylinder 2a has travelled past the connection 8b, the volume of the chamber 8a is reduced while being hermetically sealed. Thus, the pressure in the chamber 8a is increased resulting in a rising reaction force against the actuation force in the direction of the arrow P. In order to avoid the free end of the extension 21 of the cylinder 2a to hit against the bottom wall of the outer cylinder 3, an elastic rubber disk 30 may be provided at the free end of the extension 21.

We claim:

1. Brake cylinder (1) for a motor vehicle, comprising a cylinder/piston means (2) adapted to be operated by a brake pedal means for generating pressure in a hydraulic brake system of the motor vehicle, characterized in that the cylinder/piston means (2) is provided in an outer cylinder means (3) in an axially movable manner;

a spring (4) is provided to resiliently bias said cylinder/piston means (2) against said outer cylinder (3);

in a normal actuation position said piston (2b) of said cylinder/piston means (2) being essentially non-movable with respect to the cylinder (2a) of said cylinder/piston means (2), such that the cylinder piston means (2) being movable against the spring forces of said spring means (4) in said outer cylinder (3);

wherein, in an emergency actuation position said piston (2b) of said cylinder/piston means (2) is axially movable by the brake pedal with respect to the cylinder (2a) of said cylinder/piston means (2) for increasing the pressure in the hydraulic brake system of the motor vehicle; and a valve means (5) hydraulically separates said cylinder/piston means (2) from said brake system during a normal actuation and hydraulically connects said cylinder/piston means (2) with said brake system during an emergency actuation.

* * * * *